(12) United States Patent
Miljkovic et al.

(10) Patent No.: US 12,674,073 B2
(45) Date of Patent: Jul. 7, 2026

(54) HYDROPHOBIC, SELF-HEALING COATING AND COATED SUBSTRATE, AND FABRICATION METHOD

(71) Applicant: The Board of Trustees of the University of Illinois, Urbana, IL (US)

(72) Inventors: Nenad Miljkovic, Urbana, IL (US); Christopher Evans, Urbana, IL (US); Jingcheng Ma, Chicago, IL (US); Laura Porath, Zurich (CH)

(73) Assignee: The Board of Trustees of the University of Illinois, Urbana, IL (US)

( * ) Notice: Subject to any disclaimer, the term of this patent is extended or adjusted under 35 U.S.C. 154(b) by 560 days.

(21) Appl. No.: 17/980,225

(22) Filed: Nov. 3, 2022

(65) Prior Publication Data

US 2023/0399540 A1 Dec. 14, 2023

Related U.S. Application Data

(60) Provisional application No. 63/263,551, filed on Nov. 4, 2021.

(51) Int. Cl.
| | |
|---|---|
| *C09D 183/04* | (2006.01) |
| *C08G 77/398* | (2006.01) |
| *C09D 5/16* | (2006.01) |
| *C09D 7/20* | (2018.01) |
| *C09D 7/61* | (2018.01) |

(52) U.S. Cl.
CPC ......... *C09D 183/04* (2013.01); *C08G 77/398* (2013.01); *C09D 5/1675* (2013.01); *C09D 7/20* (2018.01); *C09D 7/61* (2018.01); *Y10T 428/26* (2015.01)

(58) Field of Classification Search
CPC ...... C09D 183/04; C09D 5/1675; C09D 7/20; C09D 7/61; C09D 183/14; C08G 77/398; C08G 77/56; Y10T 428/26
See application file for complete search history.

(56) References Cited

U.S. PATENT DOCUMENTS

2020/0370844 A1* 11/2020 Wang ...................... F28F 21/06

OTHER PUBLICATIONS

[NPL-1] Bapat, A; Sumerlin, B; Sutti, A.; "Bulk Network Polymers with Dynamic B—O bonds: Healable and Reprocessable Materials"; Mater. Horiz., 2020, 7, pp. 694-714. (Year: 2020).*
[NPL-2] Lee, J.; Jing, B.; Porath, L.; Sottos, N.; Evans, C.; "Shock Wave Energy Dissipation in Catalyst-Free Poly(dimethylsiloxane) Vitrimers"; Macromolecules, 2020, 53(12), pp. 4160-4173. (Year: 2020).*
Blossey, R., "Self-cleaning surfaces-virtual realities," Nature Materials, 2003. 2(5): pp. 301-306. (six (6) pages).
Wisdom, K.M. et al., "Self-cleaning of superhydrophobic surfaces by self-propelled jumping condensate," Proceedings of the National Academy of Sciences, 2013. 110(20): pp. 7992-7997 (six (6) pages).
(Continued)

*Primary Examiner* — Donald M Flores, Jr.
(74) *Attorney, Agent, or Firm* — Crowell & Moring LLP

(57) ABSTRACT

A hydrophobic, self-healing coating includes a vitrimer film having a silicone polymer network crosslinked with dynamic covalent bonds including a boronic ester, where the vitrimer film has a thickness of less than 1000 nm, and where the dynamic covalent bonds provide a mechanism for self-healing of the vitrimer film.

13 Claims, 8 Drawing Sheets

(56)          References Cited

OTHER PUBLICATIONS

Gurumukhi, Y. et al., "Dynamic Defrosting on Superhydrophobic and Biphilic Surfaces," Matter 3, 2020, pp. 1178-1195 (19 pages).

Golovin, K. et al., "Low-interfacial toughness materials for effective large-scale deicing," Science, 2019, 364(6438): pp. 371-375 (six (6) pages).

Mouterde, T. et al., "Antifogging abilities of model nanotextures," Nature Materials, 2017. 16(6): pp. 658-663 (seven (7) pages).

Epstein, A.K. et al., "Liquid-infused structured surfaces with exceptional anti-biofouling performance," Proceedings of the National Academy of Sciences of the United States of America, 2012. 109(33): pp. 13182-13187 (six (6) pages).

Genzer, J. et al., "Recent developments in superhydrophobic surfaces and their relevance to marine fouling: a review" Biofouling, 2006. 22(5): pp. 339-360. (23 pages).

Zhao, H.Y. et al., "Extreme Antiscaling Performance of Slippery Omniphobic Covalently Attached Liquids" ACS Applied Materials & Interfaces, 2020. 12(10): pp. 12054-12067 (14 pages).

Rosenberg, B.J. et al., "Turbulent drag reduction over air- and liquid-impregnated surfaces," Physics of Fluids, 2016. 28(1), pp. 015103-1-015103-8 (nine (9) pages).

Cho, H.J. et al., "Nanoengineered materials for liquid-vapour phase-change heat transfer," Nature Reviews Materials, 2016. 2: pp. 1-17 (17 pages).

Shabanian, S. et al., "Rational design of perfluorocarbon-free oleophobic textiles," Nature Sustainability, 2020, 3: pp. 1059-1066 (15 pages).

Wang, D. et al., "Design of robust superhydrophobic surfaces," Nature, 2020, 582(7810): pp. 55-59. (12 pages).

Peng, C.Y. et al., "All-organic superhydrophobic coatings with mechanochemical robustness and liquid impalement resistance," Nature Materials, 2018., 17(4): pp. 355-360 (seven (7) pages).

Wilke, K.L. et al., "Polymer Infused Porous Surfaces for Robust, Thermally Conductive, Self-Healing Coatings for Dropwise Condensation," ACS Nano, 2020. 14(11): pp. 14878-14886. (nine (9) pages).

Ma, J.C. et al., "Recent developments, challenges, and pathways to stable dropwise condensation: A perspective," Applied Physics Letters, 2020. 116(26), pp. 260501-1-260501-9 (10 pages).

Ma, J. et al., "Condensation Induced Delamination of Nanoscale Hydrophobic Films," Advanced Functional Materials, 2019, 29(43): pp. 1-10 (10 pages).

Marto, P.J. et al., "Evaluation of organic coatings for the promotion of dropwise condensation of steam," International Journal of Heat and Mass Transfer, 1986. 29: pp. 1109-1117 (nine (9) pages).

Deng, X. et al., "Candle Soot as a Template for a Transparent Robust Superamphiphobic Coating," Science, 2012, 335(6064): pp. 67-70. (five (5) pages).

Tuteja, A. et al., "Designing Superoleophobic Surfaces," Science, 2007. 318(5856): pp. 1618-1622 (six (6) pages).

Chang, H.C. et al., "Composite Structured Surfaces for Durable Dropwise Condensation," International Journal of Heat and Mass Transfer, 2020. 156, pp. 1-15 (15 pages).

Miljkovic, N. et al., "Effect of Droplet Morphology on Growth Dynamics and Heat Transfer during Condensation on Superhydrophobic Nanostructured Surfaces," ACS Nano, 2012. 6(2): pp. 1776-1785 (10 pages).

Xu, J.X. et al., "Efficient Solar-Driven Water Harvesting from Arid Air with Metal-Organic Frameworks Modified by Hygroscopic Salt," Angewandte Chemie-International Edition, 2020. 59(13): pp. 5202-5210 (nine (9) pages).

Xu, Z.Y. et al., "Ultrahigh-efficiency desalination via a thermally-localized multistage solar still," Energy & Environmental Science, 2020, 13(3): pp. 830-839 (10 pages).

Paxson, A.T. et al., "Stable Dropwise Condensation for Enhancing Heat Transfer via the Initiated Chemical Vapor Deposition (iCVD) of Grafted Polymer Films," Advanced Materials, 2014. 26: pp. 418-423 (six (6) pages).

White, S.R. et al., "Autonomic healing of polymer composites," Nature, 2001., 409(6822): pp. 794-797 (five (5) pages).

Toohey, K.S. et al., "Self-healing materials with microvascular networks," Nature Materials, 2007, 6(8): pp. 581-585 (five (5) pages).

Blaiszik, B.J. et al., "Self-Healing Polymers and Composites," Annual Review of Materials Research, vol. 40, 2010, 40: pp. 179-211 (35 pages).

Wang, S., "Self-healing polymers," Nature Reviews Materials, 2020, 5(8): pp. 562-583 (22 pages).

Scheutz, G.M. et al., "Adaptable Crosslinks in Polymeric Materials: Resolving the Intersection of Thermoplastics and Thermosets," Journal of the American Chemical Society, 2019, 141(41): pp. 16181-16196 (16 pages).

Denissen, W. et al., "Vitrimers: permanent organic networks with glass-like fluidity," Chemical Science, 2016, 7(1): pp. 30-38 (nine (9) pages).

Guerre, M. et al., "Vitrimers: directing chemical reactivity to control material properties," Chemical Science, 2020, 11(19): pp. 4855-4870 (16 pages).

Capelot, M. et al., "Metal-Catalyzed Transesterification for Healing and Assembling of Thermosets," Journal of the American Chemical Society, 2012, 134(18): pp. 7664-7667 (four (4) pages).

Jing, B.B. et al., "Catalyst-Free Dynamic Networks for Recyclable, Self-Healing Solid Polymer Electrolytes," Journal of the American Chemical Society, 2019, 141(48): pp. 18932-18937 (six (6) pages).

Porath, L.E. et al., "Importance of Broad Temperature Windows and Multiple Rheological Approaches for Probing Viscoelasticity and Entropic Elasticity in Vitrimers," Macromolecules, 2021, pp. 4782-4791 (10 pages).

Lahiri, S.K. et al, "Robust Fluorine-Free and Self-Healing Superhydrophobic Coatings by $H_3BO_3$ Incorporation with $SiO_2$-Alkyl-Silane@PDMS on Cotton Fabric," ACS Applied Materials & Interfaces, 2019, 11(10): pp. 10262-10275 (14 pages).

Bapat, A.P. et al., "Bulk network polymers with dynamic B—O bonds: healable and reprocessable materials," Materials Horizons, 2020, 7(3): pp. 694-714 (21 pages).

Han, J.R., et al., "A Catalyst-Free Epoxy Vitrimer System Based on Multifunctional Hyperbranched Polymer," Macromolecules, 2018, 51(17): pp. 6789-6799 (11 pages).

Jouyandeh, M. et al., "Highly curable self-healing vitrimer-like cellulose-modified halloysite nanotube/epoxy nanocomposite coatings," Chemical Engineering Journal, 2020, 396, pp. 1-16 (16 pages).

Grandjean, P. et al., "Changing Interpretation of Human Health Risks from Perfluorinated Compounds," Public Health Reports, 2014, 129(6): pp. 482-485 (four (4) pages).

Parsons, J.R. et al., "Biodegradation of Perfluorinated Compounds," Reviews of Environmental Contamination and Toxicology, vol. 196, 2008, 196: pp. 53-71 (20 pages).

Lee, J. et al., Shock Wave Energy Dissipation in Catalyst-Free Poly(dimethylsiloxane) Vitrimers. Macromolecules, 2020, 53(12): pp. 4741-4747 (seven (7) pages).

Yan, X. et al., "Atmosphere-Mediated Superhydrophobicity of Rationally Designed Micro/Nanostructured Surfaces," ACS Nano, 2019, 13(4): pp. 4160-4173 (14 pages).

Kenkel, S. et al., "Closed-loop atomic force microscopy-infrared spectroscopic imaging for nanoscale molecular characterization," Nature Communications, 2020, 11(1), pp. 1-10 (10 pages).

Ma, J. et al., "Condensation Induced Blistering as a Measurement Technique for the Adhesion Energy of Nanoscale Polymer Films," Nano Letters, 2020, 20(5): pp. 3918-3924 (seven (7) pages).

Cha, H. et al., "Dropwise condensation on solid hydrophilic surfaces," Science Advances, 2020, 6(2): pp. 1-7 (eight (8) pages).

Vudayagiri, S. et al., "Factors affecting the surface and release properties of thin polydimethylsiloxane films," Polymer Journal, 2013, 45(8): pp. 871-878 (eight (8) pages).

Rose, J.W., "Dropwise condensation theory and experiment: A review," Proceedings of the Institution of Mechanical Engineers, Part A: Journal of Power and Energy, 2002, 216: pp. 115-128 (14 pages).

Liu, T.L. et al., "Turning a surface superrepellent even to completely wetting liquids," Science, 2014, 346: pp. 1096-1100 (six (6) pages).

(56) References Cited

OTHER PUBLICATIONS

Xie, X. et al., "High and low thermal conductivity of amorphous macromolecules," Physical Review B, 2017. 95(3) pp. 035406-1-035406-9 (nine (9) pages).

Wang, M. et al., "Anomalies of Ionic/Molecular Transport in Nano and Sub-Nano Confinement," Nano Letters, 2020, 20(10): pp. 6937-6946 (10 pages).

Krutyeva, M. et al., "Effect of Nanoconfinement on Polymer Dynamics: Surface Layers and Interphases," Physical Review Letters, 2013, 110(10), pp. 108303-1-108303-5 (five (5) pages).

Sett, S. et al., "Lubricant-Infused Surfaces for Low-Surface-Tension Fluids: Promise versus Reality," ACS Applied Materials & Interfaces, 2017, 9(41): pp. 36400-36408 (nine (9) pages).

Sett, S. et al., "Stable Dropwise Condensation of Ethanol and Hexane on Rationally Designed Ultrascalable Nanostructured Lubricant-Infused Surfaces," Nano Letters, 2019, 19(8): pp. 5287-5296 (10 pages).

Wexler, J.S. et al., "Shear-Driven Failure of Liquid-Infused Surfaces," Physical Review Letters, 2015, 114(16): pp. 168301.-1-168301-5 (five (5) pages).

* cited by examiner

Heal
30 secs

Scratch 1 cm

HYDROPHOBIC, SELF-HEALING COATING AND COATED SUBSTRATE, AND FABRICATION METHOD

RELATED APPLICATION

The present patent document claims the benefit of priority under 35 U.S.C. 119(e) to U.S. Provisional Patent Application No. 63/263,551, which was filed on Nov. 4, 2021, and is hereby incorporated by reference in its entirety.

STATEMENT OF FEDERALLY FUNDED RESEARCH OR DEVELOPMENT

This invention was made with government support under N00014-16-1-2625 awarded by the Office of Naval Research. The government has certain rights in the invention.

TECHNICAL FIELD

The present disclosure is related generally to fabrication of hydrophobic coatings and more specifically to self-healing hydrophobic coatings comprising nanoscale-thick vitrimers.

BACKGROUND

Low surface energy hydrophobic materials have the potential to enable a plethora of functions including self-cleaning, anti-icing, anti-fogging, anti-bacterial, anti-fouling, reduced hydrodynamic drag, and enhanced heat and mass transport. The majority of engineering materials such as pure metals, alloys, ceramics, and semiconductors are intrinsically hydrophilic. Therefore, achieving stable hydrophobicity with these materials relies on developing hydrophobic coatings, which are commonly made from perfluoro-compounds (PFCs) due to their low surface energy (5-20 $mJ/m^2$). However, PFC coatings are not able to achieve long-term hydrophobicity (1-year long lifetime) for many applications because they lack mechanical robustness. Recent work has shown that surface defects such as pinholes or scratches lead to significant shortening of coating life-time. Pinhole defects lead to water penetration, which attacks the coating-substrate interface resulting in coating delamination. Furthermore, abrasion-induced crack formation in PFC coatings results in exposure of the intrinsically hydrophilic substrate, leading to wetting and droplet pinning. As polymeric PFCs usually have poor mechanical properties and low Young's modulus (1~10 GPa), pinholes are easily formed on the surface leading to premature coating failure.

Work in the past decade has attempted to enhance the overall coating robustness by added mechanical protective structures to act as sacrificial "armor." Despite the demonstrated durability, such designs have a major drawback: the modified coatings need to be thick (i.e., >10 μm) due to the height of the protective structures. However, many applications require hydrophobic coatings to be thin (i.e., <100 nm). Some of the most important include dropwise condensation, atmospheric water harvesting, and water desalination, where the heat and mass transfer rate can be enhanced by an order of magnitude by using hydrophobic surfaces, with the merit of these offset if the coating is thick (>100 nm) and thermally insulating. Although in recent years significant effort has been placed on designing thick and thermally conductive composite materials to overcome this challenge, scalable fabrication techniques for these coatings remain elusive. The importance of defect prevention has been increasingly realized for improving the durability of thin hydrophobic coatings. It would be advantageous to develop scalable, self-healing thin coatings (i.e., <100 nm thick) which do not necessarily need the same hardness or elastic modulus as inorganic materials but instead could enhance coating durability by actively repairing defects.

BRIEF SUMMARY

A hydrophobic, self-healing coating; a coated substrate displaying self-healing capability and hydrophobicity; a heat transfer component; and a coating solution for forming a self-healing vitrimer film are described herein, along with methods of forming a hydrophobic, self-healing coating on a substrate.

The hydrophobic, self-healing coating comprises a vitrimer film including a silicone polymer network crosslinked with dynamic covalent bonds having a boronic ester. The vitrimer film has a thickness of less than 1000 nm.

The coated substrate displaying self-healing capability and hydrophobicity comprises a substrate comprising a metal, an alloy, a ceramic, a glass, and/or a semiconductor; a vitrimer film on the substrate. The vitrimer film includes a silicone polymer network crosslinked with dynamic covalent bonds having a boronic ester, where the vitrimer film has a thickness of less than 1000 nm. The dynamic covalent bonds provide a mechanism for self-healing of the vitrimer film.

The heat transfer component comprises the coated substrate of the present invention and is provided for use in water treatment, power generation, petroleum refining, food processing, aviation, naval applications, and/or heating, ventilation, air conditioning and refrigeration (HVAC-R) systems.

The coating solution for forming a self-healing vitrimer film comprises a silicone diol, a crosslinking agent, and an organic solvent. The crosslinking agent includes a boron compound.

A method of forming a hydrophobic, self-healing coating on a substrate comprises depositing the coating solution of the present invention onto a substrate to form a coated substrate; heating the coated substrate under vacuum, whereby the silicone diol and the crosslinking agent react to form a vitrimer film having a silicone polymer network crosslinked with dynamic covalent bonds comprising a boronic ester.

BRIEF DESCRIPTION OF THE DRAWINGS

FIGS. 4C and 4D show the observed response of the coatings to artificial nano-indented pinholes (FIG. 4A). FIGS. 4E and 4F show the observed response of the coatings to scratches (FIG. 48).

DETAILED DESCRIPTION

Among several available material designs for self-healing coatings, vitrimers and dynamic networks are promising for scalable thin film (i.e., <100 nm) synthesis. Commonly used self-healing materials consist of composites that embed self-healing agents in the form of microscale capsules or microvascular networks that are released upon damage. The structure of the healing agents is >1 μm, must be designed to hold a range of liquids, and would be difficult to process into thin films with thickness less than the length scale of the capsules. Vitrimers, dynamic covalent polymer networks with associative or network conserving bonds, have been demonstrated to exhibit self-healing abilities in addition to reprocessability. The nature of the bond exchange enables vitrimers to retain their modulus upon heating. The fabrication of vitrimer-based self-healing materials is also much more straightforward when compared to other self-healing materials.

In this disclosure, the design and synthesis of a hydrophobic, vitrimer-based self-healing coating is described. A vitrimer has been developed with polydimethylsiloxane network strands and dynamic boronic ester crosslinks (dyn-PDMS) to take advantage of the inherent hydrophobic nature of silicones. The dynamic covalent bonds provide a mechanism for self-healing and damage resistance of the vitrimer. This work is believed to be the first example of PDMS-based thin vitrimer films having a nanoscale thickness that utilize the vitrimer chemistry for robust self-healing hydrophobicity.

Figure 1A:
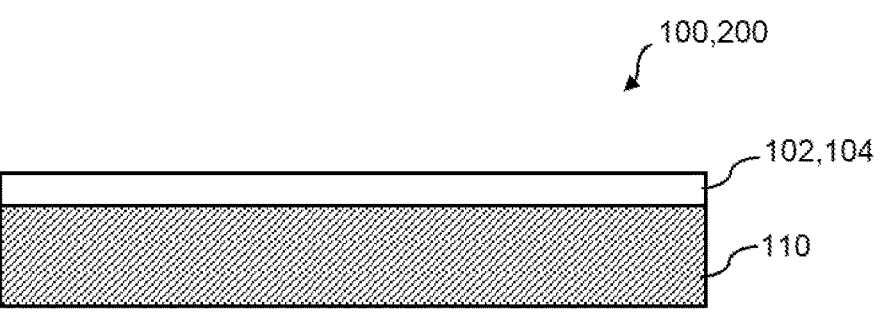
FIG. 1A is a schematic showing a coated substrate comprising the hydrophobic, self-healing coating described herein, which includes a vitrimer film; the coated substrate may be used for a heat transfer component or another part, such as a solar panel, wind turbine, or part of a building or vehicle.
Figure 1B:
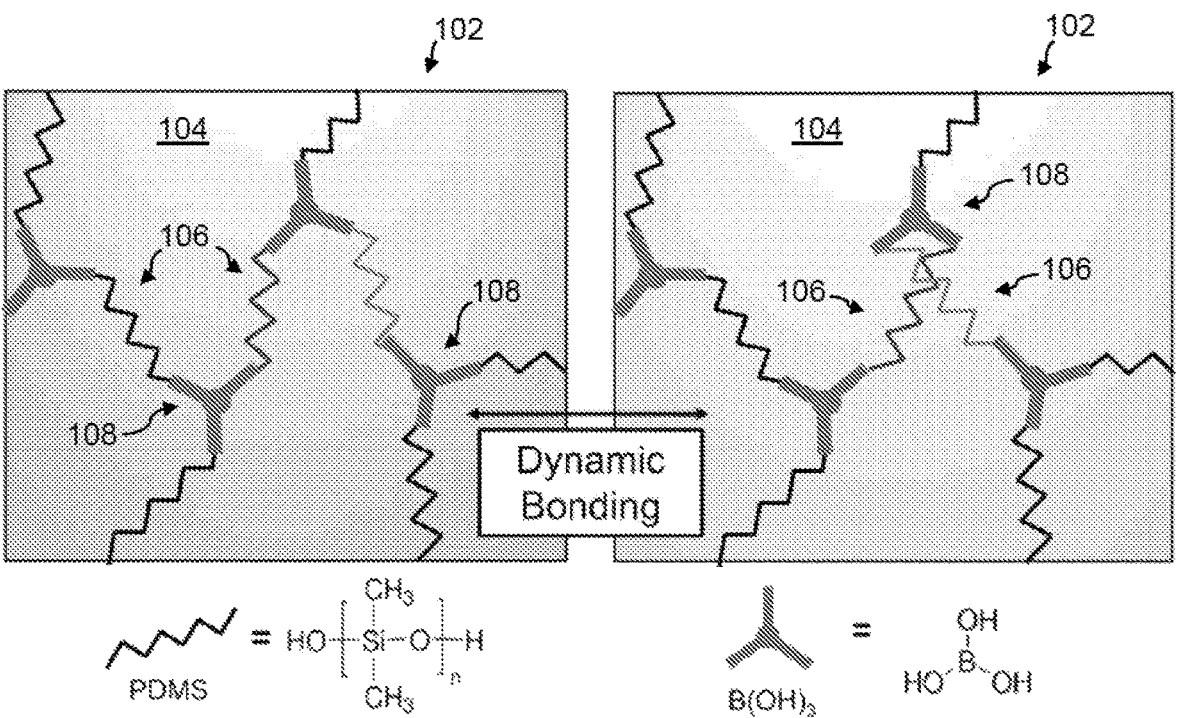
FIG. 1B illustrates the vitrimer film and shows the chemical structure of a dynamic covalent network including PDMS strands and dynamic covalent bonds comprising a boronic ester.

Referring to FIGS. 1A and 1B, the hydrophobic, self-healing coating 102 comprises a vitrimer film 104 including a silicone polymer network 106 crosslinked with dynamic covalent bonds 108 comprising a boronic ester. The vitrimer film 104 has a thickness of less than 1000 nm, and the dynamic covalent bonds 108 provide a mechanism for self-healing of the vitrimer film 104. For example, FIG. 1B illustrates the chemical structures of a dynamic covalent network made with PDMS strands and boric acid through transesterification. The boric acid-PDMS complexation results in trigonal boron sites, where the B—O bonds can exchange in an associative or conserved manner. Self-healing may refer to the healing or repair of a damaged region of the vitrimer film 104 facilitated by the dynamic covalent bonds 108 in the polymer network 106, whereby material surrounding the damaged region recombines and/or fills in the damaged region.

In some examples, the vitrimer film 104 may be optically transparent. As indicated above, the vitrimer film 104 has a nanoscale thickness of less than 1000 nm. In some examples, the vitrimer film 104 may have a thickness in a range from about 1 nm to about 500 nm, from about 1 nm to about 300 nm, from about 1 nm to about 100 nm, 1 nm to about 50 nm, from about 1 nm to about 20 nm, and/or from about 1 nm to about 10 nm.

The self-healing coating 102 is highly resistant to water and may exhibit self-cleaning capabilities. As described in the examples below, the vitrimer film 104 may exhibit an advancing contact angle ($\theta_a$) of 80° or higher with respect to water and/or a contact angle hysteresis from about 0° to about 40° with respect to water. In some embodiments, the vitrimer film 104 may comprise a surface energy of about 30 mJ/m$^2$ or less.

Due to its self-healing capabilities, the vitrimer film 104 may maintain durability after exposure to mechanical damage, such as scratching, cutting, indenting, and/or steam condensation. In some examples, the vitrimer film 104 shows no signs of degradation for at least 17 days while undergoing steam condensation. The vitrimer film 104 may also or alternatively exhibit stable dropwise condensation for at least 17 days while undergoing steam condensation. In some embodiments, the vitrimer film 104 may be resistant to icing, corrosion, bacteria, and/or fouling.

A coated substrate 100 displaying self-healing capability and hydrophobicity is illustrated in FIG. 1A. The coated substrate 100 comprises a substrate 100 including a metal, an alloy, a ceramic, a glass, and/or a semiconductor, and a vitrimer film 104 on the substrate 110, where the vitrimer film 104 has a silicone polymer network 106 crosslinked with dynamic covalent bonds 108 comprising a boronic ester, as illustrated in FIG. 1B. The vitrimer film 104 has a thickness of less than 1000 nm. In some embodiments, the vitrimer film 104 has a thickness of less than 100 nm. The vitrimer film 104 may have any or all of the characteristics described above or elsewhere in this disclosure. In some examples, the substrate 110 may be part or all of a heat exchanger. Alternatively, the substrate 110 may be part or all of a solar panel. In other examples, the substrate 110 may be part or all of a wind turbine. Alternatively, the substrate 110 may be part or all of a building or vehicle. The coated substrate 100 described herein can be used for heat transfer, water harvesting or desalination.

A heat transfer component 200 is also provided, as shown in part in FIG. 1A. The heat transfer component 200 may comprise the coated substrate 100 described herein for use in various applications and systems, examples include but are not limited to, water treatment, power generation, petroleum refining, food processing, aviation, naval applications, and/or heating, ventilation, air conditioning and refrigeration (HVAC-R) systems.

The inventors show that for vitrimer films 104 having nanoscale thickness (e.g., <10 nm), the transparent coating maintains exceptional hydrophobicity after scratching, cutting, indenting, and steam condensation. The long-term durability of the coating is examined by exposing the surface to steam condensation due to its sensitivity to surface defects. Further details of the self-healing capacity and hydrophobicity of the vitrimer film 104 are included in the example section.

In addition to its demonstrated robustness, the vitrimer film 104 is also fluorine-free, which leads to greater environmental friendliness owing to lower bioaccumulation when compared to PFCs, which can take hundreds of years to degrade. Silicone-based materials and vitrimers can be recycled and reused using organic solvents such as toluene.

The vitrimer film 104 may be prepared using a coating solution comprising a silicone diol, a crosslinking agent, and an organic solvent. The silicone diol may comprise a polydimethylsiloxane (PDMS) diol. In some embodiments, the silicone diol has an average molecular weight in a range from 500 g/mol to about 11,000 g/mol. The crosslinking agent may comprise a boron compound selected from the group consisting of boric acid, boronic acid and boronic acid derivatives. In some embodiments, the boronic acid derivative is selected from the group consisting of phenyl diboronic acid, biphenyl diboronic acid, tetrahydroxydiboron, diboronic acid, and thiophenediylbisboronic acid. The organic solvent may be selected from the group consisting of methanol, ethanol, isopropanol, toluene, tetrahydrofuran, ethyl acetate, and chloroform. In some examples, a weight ratio of the boron compound to the organic solvent is in a range from about 1:100 to about 1:5000. A stoichiometric ratio of the silicone diol to the crosslinking agent may be in a range from about 1:1 to about 10:1, from about 1:1 to about 5:1, from about 1:1 to about 2:1, from about 1.2:1 to about 1.9:1, from about 1.3:1 to about 1.8:1, from about 1.5:1 to about 1.7:1, or from about 1.6:1 to about 1.4:1. It has been shown in the below non-limiting examples that the stoichiometric ratio of PDMS to crosslinking agent can affect the advancing contact angle and the contact angle hysteresis. According to some embodiments, the coating solution may have a viscosity in a range from about 25 cSt to about 10,000 cSt.

A method of forming a hydrophobic, self-healing coating on a substrate may include depositing the above described coating solution onto a substrate to form a coated substrate, and heating the coated substrate under vacuum, whereby the silicone diol and the crosslinking agent react to form a vitrimer film having a silicone polymer network crosslinked with dynamic covalent bonds comprising a boronic ester. During heating of the coating solution, reaction of the silicone diol with the crosslinking agent is initiated, and then may be halted by cooling.

The silicone polymer network may comprise polydimethylsiloxane (PDMS). The boronic ester may be formed from a boron compound and an organic solvent. The boron compound may be selected from the group consisting of boric acid, boronic acid and boronic acid derivatives. In some embodiments, the boronic acid derivative is selected from the group consisting of phenyl diboronic acid, biphenyl diboronic acid, tetrahydroxydiboron, diboronic acid, and thiophenediylbisboronic acid. The organic solvent may be selected from the group consisting of methanol, ethanol, isopropanol, toluene, tetrahydrofuran, ethyl acetate, and chloroform.

The vitrimer film can be deposited easily on a variety of substrates using spin-coating and also with more scalable dip-coating. One advantage of the deposition process is that the annealing step may remove excessive coating materials, hence even techniques such as spray and brush coating can achieve thin layers of vitrimer film. In some embodiments, the depositing may comprise spin-coating, dip-coating, spray-coating and/or brush coating.

In some examples, the heating is carried out in a vacuum oven at a pressure of no greater than about 250 mTorr. The heating may also or alternatively be carried out at a temperature in a range from about 80° C. to about 120° C. The heating may occur over a time duration in a range from about 12 hours to about 18 hours.

In some embodiments, the method may further include, prior to depositing the coating solution, cleaning the substrate by alcohol and/or water to form a cleaned substrate. The alcohol may be selected from the group consisting of methanol, ethanol, and propanol. Prior to deposition, the coating solution may also be heated, stirred, and/or filtered the coating solution. In some embodiments, the method may further include, after cleaning the substrate, purifying the substrate. The purifying may comprise plasma cleaning.

The substrate may be made from a metal, an alloy, a ceramic, a glass, and/or a semiconductor. For example, the substrate may comprise a metal or an alloy containing aluminum, copper, stainless steel, titanium, and/or nickel superalloy.

The examples below illustrate the disclosed coating and fabrication methods, but are not intended to limit the scope of any claims thereto. In the examples, the hydrophobic, self-healing coatings according to the disclosure are prepared and applied as a film or coating onto a substrate. The applied or coated substrates are evaluated according to a variety of tests as described below in order to characterize their hydrophobicity and self-healing properties.

Experimental Examples

Fabrication

The vitrimer film, which may be referred to as a dyn-PDMS film or material below, was synthesized using poly (dimethyl siloxane) diol (Sigma Aldrich, average molecular weight=550 g/mol, kinematic viscosity=25 cSt) and boric acid (Sigma Aldrich, 99.5%). A stoichiometric ratio of 1.5:1 PDMS to boric acid ($B(OH)_3$) was calculated and weighed out on a high precision analytical balance at gram scale. The boric acid was dissolved in isopropanol (Sigma Aldrich, 99%) in a ratio of 0.1 g/mol $B(OH)_3$ to 2.5 mL of isopropyl alcohol (IPA) by sonication at room temperature for 30 minutes. The $B(OH)_3$+IPA solution was added to PDMS in a 20 mL vial which was heated at 75° C. and stirred at 250 rpm for 30 minutes. The temperature was then increased to 105° C., and the reaction vial was uncapped to proceed in an open environment. Twenty minutes after bubbles formed in the solution, indicating the release of $H_2O$ due to the reaction between the PDMS diol and boric acid taking place and the beginning of network formation, the temperature was decreased to room temperature to prevent full conversion. There was a critical decrease in the —OH by analysis of the FITR spectrum. The initial solution has 4 mL of IPA per 1 gram of PDMS, and the IPA is then reduced due to evaporation on heating. When the IPA has been reduced from 4 mL to 1 mL, which can be gauged based on the size of the vial, then the solution is ready for spin coating. The PDMS concentration in IPA was 1 g/mL and the viscosity was ~35 cSt.

To make dyn-PDMS thin films, the PDMS/B(OH)$_3$/IPA solution was first strained through a 0.2 μm PTFE filter to remove impurities. Silicon wafers, glass, copper, and aluminum substrates were first cleaned by rinsing in ethanol, water, and IPA in sequence, then purified through air plasma cleaning (Harrick Plasma, PDC-32G) for ten minutes at high power (RF, 18 W). Substrates were used within 15 minutes of cleaning. For spun coated samples, 0.1 mL of filtered solution was pipetted onto 2 cm$^2$ substrates. The same ratio was used for larger samples. A Polos SPS Spin Coater was used with the following spin coating procedure conditions for all samples: spin speed of 6000 rpm, spin acceleration of 500 rpm/s, test length of 150 s. For dip coated substrates, the substrate was lowered into the PDMS/B(OH)$_3$/IPA solution. The edges and backside of each substrate were dabbed dry using a Kimwipe. The dip-coated samples were generally thicker than samples made with spin-coating. As the deposited material by dip-coating is initially much thicker than the spun coated material, the final material does not reduce to the same thickness as the spun coat samples under the same curing conditions.

Thin films are sensitive to the time and temperature of the drying protocol. Thin film PDMS vitrimer samples were first cured in a vacuum oven at 100° C. for 15 hours at a vacuum level of 28 inHg or 6 kPa absolute pressure. A sharp reduction in film thickness from 2 μm to about 10 nm was observed and attributed to low molecular weight PDMS diol being removed by evaporation from vacuuming prior to curing into a network. Samples made via this procedure have shown good reproducibility with a consistent thickness of 6±3 nm and consistent contact angle behavior. All the thickness measurements were performed using the samples on a polished silicon wafer. The sample thickness on metals is challenging to measure due to the relatively large metal surface features comparing to coating thickness. When the thin film samples were heated without vacuum on a covered hot plate at 60° C. for three hours, followed by 100° C. heating overnight, the resulting films were approximately 2 μm thick. The polymer strands incorporated into the network with pre-curing are less susceptible to volatility. To better control the thickness of the developed coatings, a series of vacuum tests (all at 28 inHg vacuum level) were conducted. It was determined that 12 hours at 80-90° C. produced sub-10 nm thick films, while 12 hours at 65° C. led to ~350 nm thick films. For the same tests done at room temperature with no heat added to the vacuum oven, the thin films were ~4 μm thick. By conducting extensive fabrication trials, an effective method for thickness control was determined by tuning the temperature of the vacuum oven during the curing step.

The existence of the B—O bonds in dyn-PDMS films of different thickness was examined by infrared (IR) spectroscopy. For bulk materials, the distinct appearance of B—O bonds in dyn-PDMS when compared to linear PDMS has been demonstrated in previous work. Attenuated total reflection Fourier-transform infrared spectroscopy (ATR-FTIR, Bruker Alpha) was used to study dyn-PDMS films having 355 nm and 4 μm thicknesses. The ATR-FTIR penetration depth was >1 μm, and showed poor sensitivity for thinner (5 nm thick) dyn-PDMS films. Therefore, photo-induced force microscopy (AFM-IR, Molecular Vista) was used to obtain better sensitivity for the 5 nm thick film. For the dyn-PDMS films, a B—O peak was observed at 1330~1359 cm$^{-1}$ for both samples, showing the existence of B—O bonds and confirming the existence of the network. Although a part of the IR signal of the 355 nm thick film comes from the polished silicon wafer substrate, the substrate does not contain characteristic peaks at the 1359±5 cm$^{-1}$ position, which further confirms the presence of B—O bonds. Even for the thinnest networks, the 5 nm film was shown to be spatially uniform based on a scan of the absorption peak at 1359 cm$^{-1}$ of a 5 μm×5 μm area. The majority of intensity variations is expected to stem from the change in surface chemistry (uncontrolled volatile organic compounds absorbed on the surface) and instrument noise (usually within 30% of the intensity from multiple sources including optical forces, tip enhanced and direct thermal expansion and photoacoustic effects) rather than changes in surface morphology. The AFM scan image shows the sample to be smooth, with roughness on the order of 1 nm. Furthermore, it is confirmed the existence of the film and measured the thickness of the film on a polished silicon wafer using AFM step scanning, which also showed the existence of the nanoscale thin film.

To compare the mechanical robustness of the PDMS vitrimer film with PFC materials, a 75-nm-thick amorphous fluorinated polymer film (CF$_x$, x~1) as a control sample and model material were deposited on the same polished Si wafer substrate using plasma enhanced chemical vapor deposition (PECVD, See Method Section). A second control sample was made from a commercial permanent PDMS network kit (Sylgard 184, Dow Chemicals) to show the unique healing ability of the dynamic network. Further details of the material fabrication, characterizations, as well as equipment and protocols used are included in the Methods section.

Surface Chemistry and Wettability

The wettability of dyn-PDMS films was determined by spin-coating on a polished Si wafer and performing water contact angle measurements using a microgoniometer (MCA-3, Kyowa Interface Science). The apparent advancing contact angle ($\theta_a$) on a flat surface largely reflects the intrinsic surface energy of the material, and contact angle hysteresis, defined as the difference between advancing and receding contact angles $\Delta\theta = \theta_a - \theta_r$, characterizes the degree of chemical and topological homogeneity of the surface.

As the hydrophobicity of the PDMS vitrimers mainly stems from the contribution of the PDMS backbone, the wettability of the linear-PDMS thin film was first examined to estimate the upper-bound of the dyn-PDMS apparent advancing contact angle. For a deionized (DI) water droplet on the 17±1 nm thick linear-PDMS film, the advancing contact angle was measured as $\theta_a = 100\pm1°$ which is consistent with previous results on methyl group-terminated surfaces. For the same DI water droplet on the dyn-PDMS film, $\theta_a = 93\pm3°$ which is slightly lower than the linear-PDMS film, presumably due to the presence of hydrophilic boronic esters. Although the dynamic polymer network has a reduced $\theta_a$ compared to linear-PDMS, the contact angle hysteresis of $\Delta\theta = 13\pm4°$ was much smaller than for the linear-PDMS film ($\Delta\theta = 40\pm1°$). The inventors found that the high contact angle hysteresis of the linear PDMS did not originate from surface impurities or heterogeneity, but rather because the linear PDMS has small molecular size and behaves like a viscous liquid. During steam condensation on a linear PDMS coated Si wafer sample, droplet cloaking was observed. Hence, the high contact angle hysteresis originated from droplet pinning by capillary forces from the coating material. The hydrophobicity of the surface could be further improved by tuning the ratio between PDMS and boric acid. It was found that slightly increasing the PDMS to boric acid ratio from the stoichiometrically ideal 1.5:1 to 1.7:1 resulted in the highest possible advancing contact angle $\theta_a=100\pm1°$ and a smaller contact angle hysteresis of $\Delta\theta=6°$.

In order to obtain a quantitative measure of surface energy, the contact angle behavior on both 1.5:1 and 1.7:1 dyn-PDMS using a non-polar liquid, diiodomethane (Sigma Aldrich, ReagentPlus, 99%) was characterized. The advancing contact angles $\theta_a$ of diiodomethane droplets on 1.5:1 and 1.7:1 dyn-PDMS were 72°±2° and 73°±2°, respectively. Combining with the contact angle of deionized water droplets, the surface energy of the 1.5:1 dyn-PDMS was determined to be $\gamma_{s,d}=21.8\pm0.6$ mJ/m², and $\gamma_{s,p}=3.1\pm0.9$ mJ/m². The surface energy of the 1.7:1 dyn-PDMS was determined to be $\gamma_{s,d}=21.3\pm0.6$ mJ/m², and $\gamma_{s,p}=1.2\pm0.7$ mJ/m². The dispersive surface energy of both surfaces is consistent with measurements on a permanent PDMS surface (19-21 mJ/m²). It was not expected that the boric oxides to contribute significantly to the dispersive surface components because the atoms from the DMS diols are 10 times higher in concentration than the ones contributed by the boric acid, hence the van der Waals interaction between dyn-PDMS with water should be similar to typical PDMS. The total surface energy of both dyn-PDMS samples was approximately 23-25 mJ/m², slightly higher than commonly measured on polytetrafluoroethylene (PTFE, 10~20 mJ/m²).

Details of the surface energy measurements are included in the Methods section. Coatings on aluminum and copper substrates showed similar advancing contact angles with higher AO due to the roughnesses of these substrates. In addition to dyn-PDMS's hydrophobic property, it is transparent as shown by UV-Vis-NIR spectra (Varian Cary 5G UV-Vis-NIR Spectrophotometer), and can be applied on solar panels or commercial windows to achieve self-cleaning, in contrast to many other PFC-based thick coatings.

Self-Healing Properties

Figure 2C:
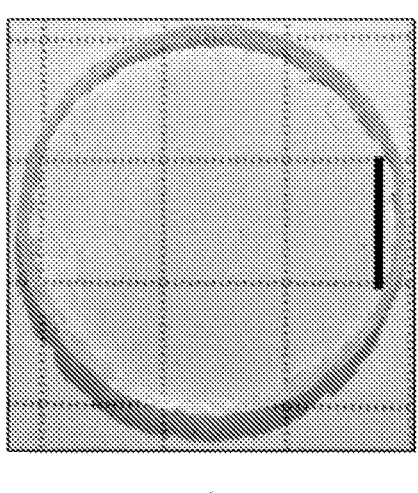
FIGS. 2A-2C show optical top-view images of an exemplary bulk cylinder comprising the vitrimer film healing at room temperature after being scratched in the center using a razor and healed at room temperature after 1 psi of pressure was applied.
Figure 2B:
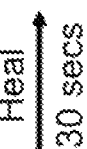
Figure 2B:
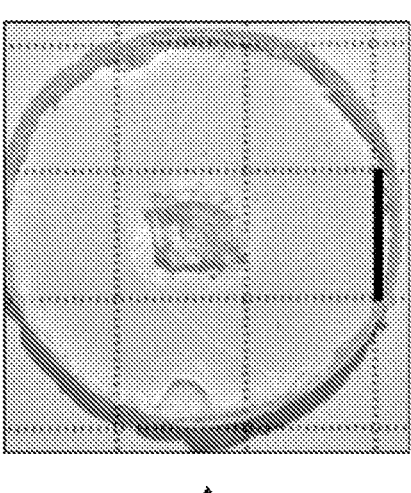
Figure 2A:
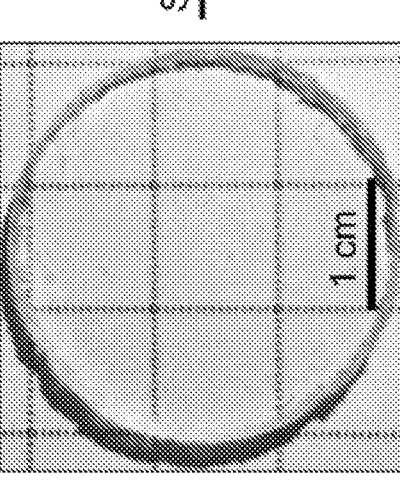
Figure 3B:
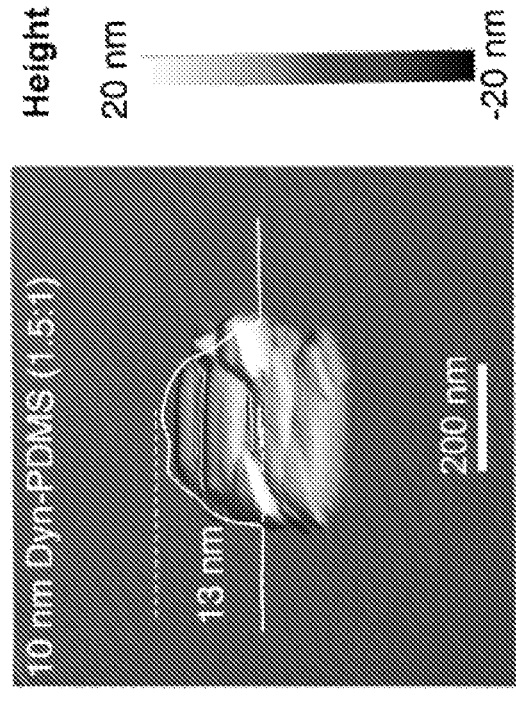
FIGS. 3A and 3B illustrate the response of the fluorinated polymer (CF$_x$) and vitrimer films to AFM area scratches with a contact force of 2 μN. The area scratch was performed at the center 200 nm×200 nm area.
Figure 3A:
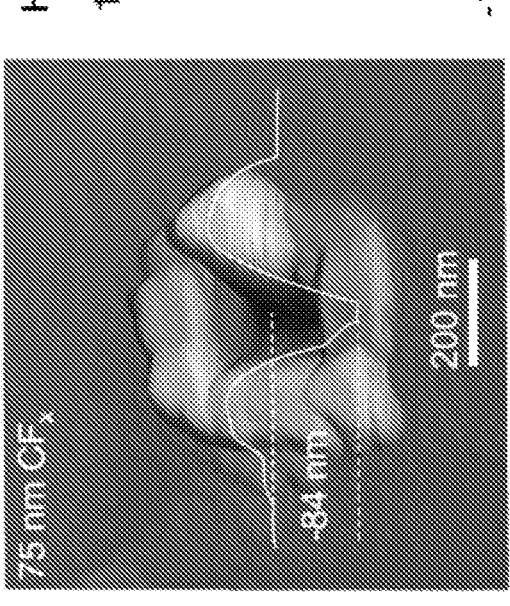

To gain experimental insight into the PDMS vitrimer's self-healing capacity when exposed to external mechanical damage, area scratches were imposed at length scales ranging from millimeters down to nanometers to represent a variety of possible damage mechanisms. Two millimeter-thick bulk dyn-PDMS samples were synthesized and scratched using a razor blade. After pressing the damaged samples in a hydraulic press at ~1 psi gauge pressure for 30 seconds at room temperature, the scratches fully healed, and the sample became optically clear and as uniform as prior to damage (See FIGS. 2A-2C). For thin dyn-PDMS films after thermal annealing, nanoscale defects such as pinholes and particle scratches are as critical for durability as macroscale damage. Hence, the self-healing performance at the nanoscale were examined by creating scratches and pinholes using an atomic force microscope (AFM). A constant force of 2 µN was applied by the AFM tip to the surface in contact mode when making an area scratch (200 nm×200 nm area). Tapping mode imaging was then performed in-situ one minute after damaging the surface. It was observed that material surrounding the area scratch re-combined, and an ~10 nm tall bump formed, completely covering the pinhole (See FIG. 3B). The inventors were unable to observe the dynamic process of healing using AFM as the pinhole was already covered by material in the time it took to scan the 200 nm by 200 nm area (10-100 s). The precise molecular mechanism governing the nanometer-scale self-healing is under current investigation; however, the sample viscosity is 107 Pa s at room temperature which is too large for gravity-driven flow on these time scales. The rapid healing response facilitated by the dynamic bonds and promoted by the thin layer of material was qualitatively different when compared to the PFC polymer thin films. Referring to FIG. 3A, applying the same area damage to the surface of the 75 nm-thick $CF_x$ film deposited on an identical Si wafer substrate left permanent scratches and pinholes that could not be removed. FIG. 3A shows the left permanent damage on $CF_x$, while the self-healing vitrimer film (FIG. 3B) was left with a bump of materials covering the damaged hole.

Figures 4A, 4B, 4C, 4D, 4E, 4F:
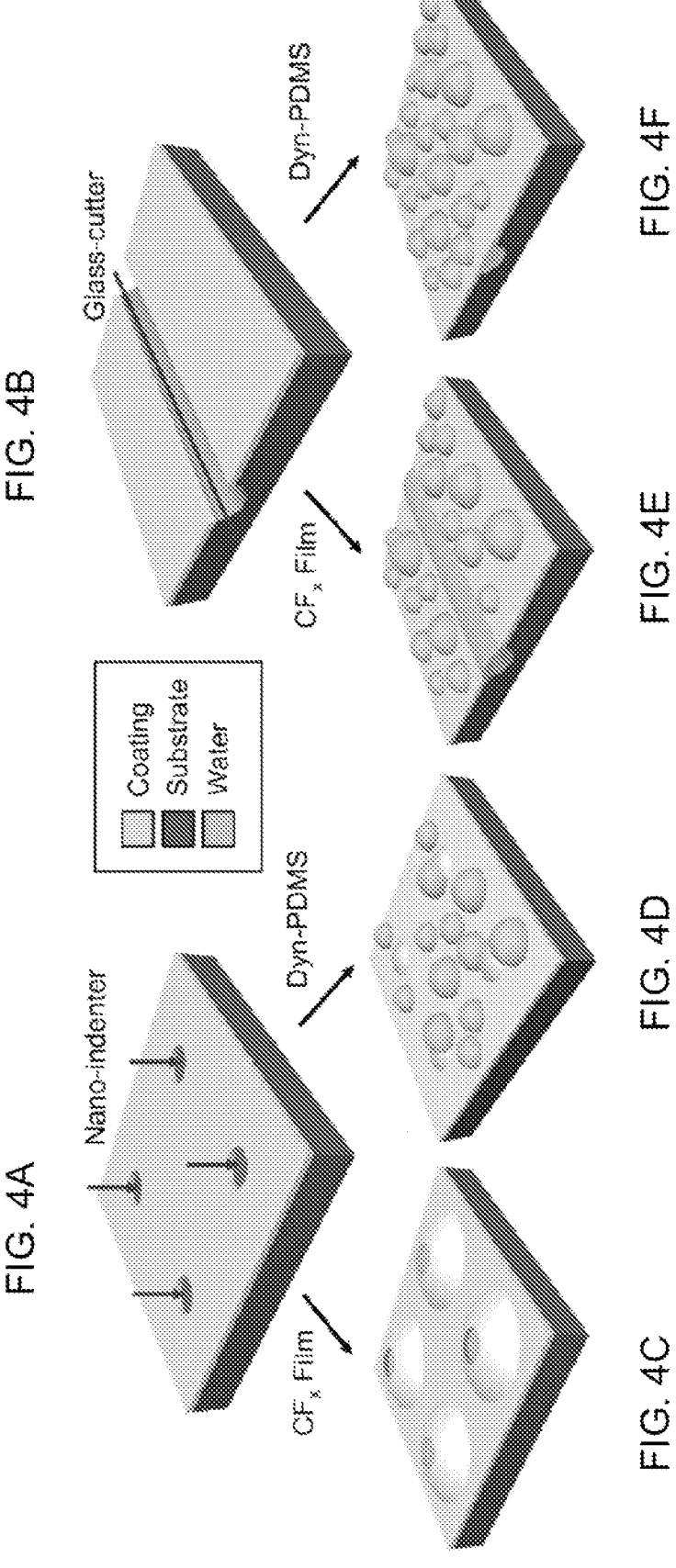
FIGS. 4A-4F are schematics comparing exemplary vitrimer ("dyn-PDMS") and CF$_x$ thin-film hydrophobicity.
Figures 5A, 5B, 5C, 5D:
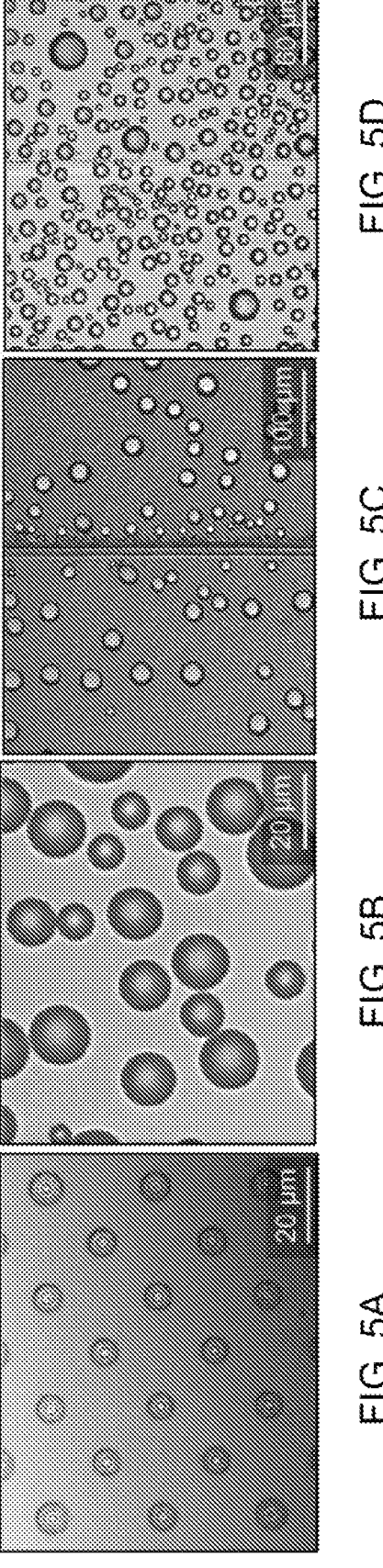
FIGS. 5A-5D are top view optical microscopy images of the CF$_x$ film and the dyn-PDMS film during steam condensation, where the optical images of FIGS. 5A and 5C correspond to the structures of FIGS. 4C and 4E, and the optical images of FIGS. 5B and 5D correspond to the structures of FIGS. 4D and 4F.
Figures 6A, 6B, 6C, 6D, 7A, 7B, 7C, 7D:
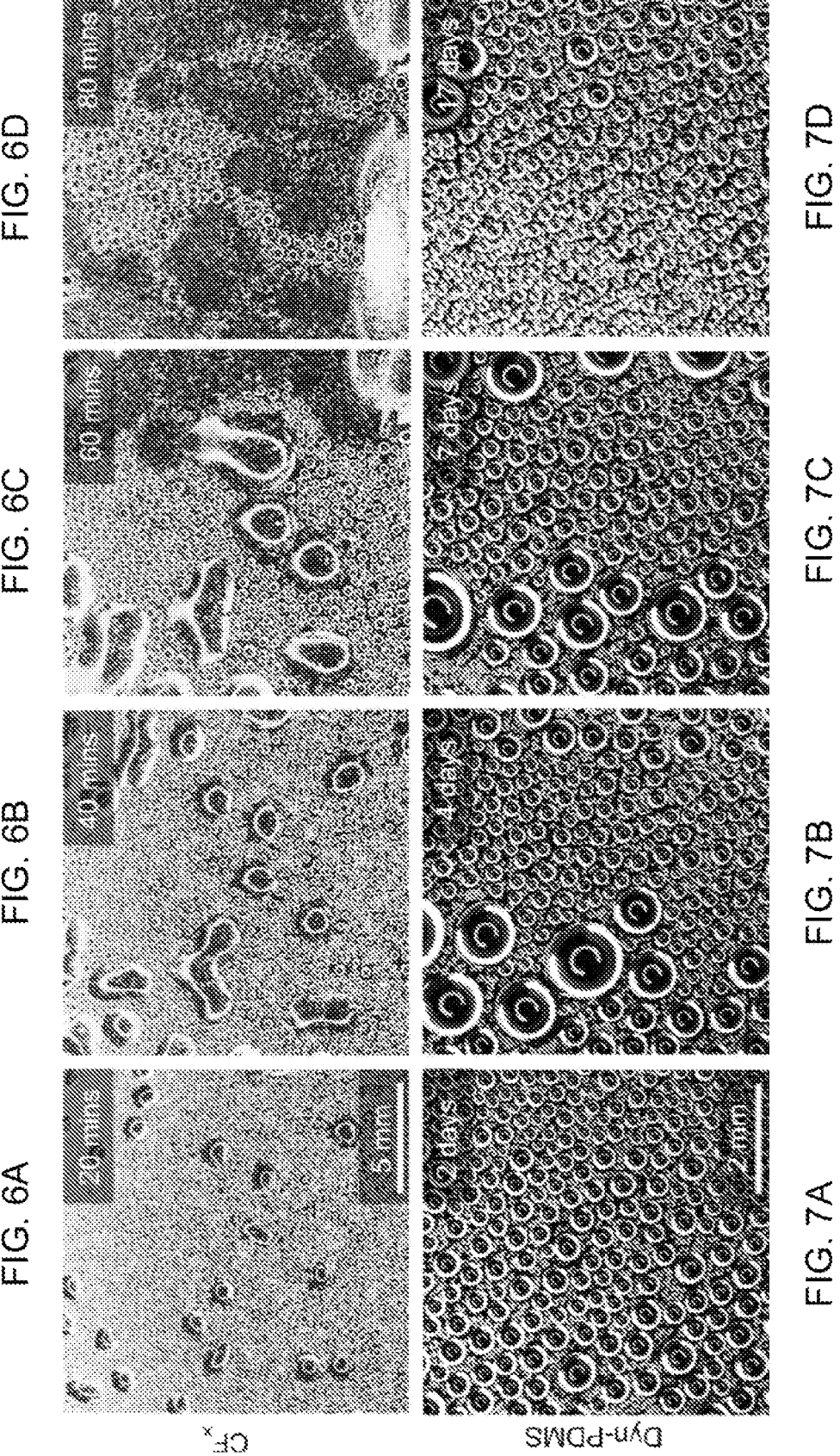
FIGS. 6A-6D show time-lapse optical images of steam condensation on a CF$_x$ coated Si wafer.
FIGS. 7A-7D show time-lapse optical images of steam condensation on an exemplary 10 nm vitrimer (1.5:1) coated Si wafer.

The self-healing capacity of the above-described dyn-PDMS thin film enables the prevention of degradation in hydrophobicity caused by defects and mechanical damage from pinholes and scratches. Specifically, nanoscale pinholes that are commonly observed on thin polymer films lead to moisture penetrating and reaching the coating-substrate interface, which results in water blister formation and delamination. The continual delamination eventually exposes the hydrophilic substrate, representing the key limitation for the successful development of thin and durable hydrophobic coatings for condensation applications over the past century. As demonstrated in FIG. 4A, artificial pinhole arrays were created on $CF_x$ thin films using nano-indentation at 1.2 mN force with a standard Berkovich tip and the behavior of steam condensation on these pinholes was observed using a top-view optical microscope (See Method Section). Steam condensation on the pinholes results in arrays of water blisters forming beneath the coating. However, using the same indentation method on the dyn-PDMS film described herein did not result in visible pinhole formation due to rapid self-healing. Hence, no blisters were able to initiate while steam was condensing on the sample (FIGS. 4D and 5B).

Scratch defects are another critical and well-known limitation to achieving durable hydrophobicity. Water droplets having contact with scratches are pinned in place which results in water film formation due to adhesion with the exposed hydrophilic substrate. The inventors conducted scratch experiments on both dyn-PDMS and $CF_x$ films using a glass cutter to damage both the coatings and the polished Si wafer beneath the film, as shown in FIG. 4B. When condensing steam on the $CF_x$ sample, the scratch-exposed hydrophilic Si wafer initiated local water formation in the scratch in the form of a thin linear film that filled the scratch and advanced on the hydrophobic areas due to Gibbs criteria-initiated pinning (See FIGS. 4E, 5C). However, on the dyn-PDMS surface discrete droplets grew over the damaged scratch and were not pinned, showing that the damaged area was able to recover its hydrophobicity (See FIGS. 4F and 5D).

Applications of the Vitrimer Films

The demonstrated exceptional self-healing capability of the vitrimer thin films makes them a suitable ultra-thin coating for long-term hydrophobicity. Due to the self-healing mechanisms of vitrimers, the dyn-PDMS thin films can resist mechanical degradation or repair early stage pinholes and thus maintain long-term hydrophobicity. As a last quantification of durability, the inventors demonstrated long-term performance in direct steam condensation conditions and compared with conventional PFC materials. Samples were attached to a Peltier based thermal plate vertically using double-sided copper tape. The cold plate was held at 5° C. and all experiments were done in ambient conditions of 22° C., 45% relative humidity. The thickness difference between $CF_x$ and dyn-PDMS film does not cause a difference in sample subcooling as both are 'thermally thin' compared to the 525 µm thick silicon wafer substrate. Hence, it was not expected that the subcooling difference between the two samples to be higher than 5%. It was assumed the thermal conductivity of the polished silicon wafer to be $k_{Si}=140$ W/m-K, and the thermal conductivity of both the $CF_x$ film and dyn-PDMS film to be $k_{CFx}=k_{dyn}=0.2$ W/m-K, which is the typical thermal conductivity of amorphous polymeric materials. The relative thermal resistance of the $CF_x$ film ($R_{s,CFx}$) when compared to the one of polished silicon wafer ($R_{s,Si}$) is: $R_{s,CFx}/R_{s,Si}=(h_{CFx}/h_{Si})(k_{Si}/k_{CFx})\sim4\%$, while the dyn-PDMS film is: $R_{s,dyn}/R_{s,Si}=(h_{dyn}/h_{Si})(k_{Si}/k_{dyn})\sim0.5\%$, confirming the negligible difference in sample subcooling. As shown in FIGS. 7A-7D, stable dropwise condensation occurred on the dyn-PDMS films for 17 days with no signs of degradation as quantified by the lack of formation of water blisters or increased contact angle hysteresis after conducting the full test. The apparent advancing contact angle of the tested dyn-PDMS sample was 94°±3° with a contact angle hysteresis of 10±5°. The $CF_x$ film degraded in hours due to the formation of water blisters, as shown in FIGS. 6A-6D. Over 50% of the PFC-based film delaminated after only 80 minutes of condensation. The dyn-PDMS thin films far surpassed the durability of the conventional materials used.

Figures 8A, 8B, 8C:
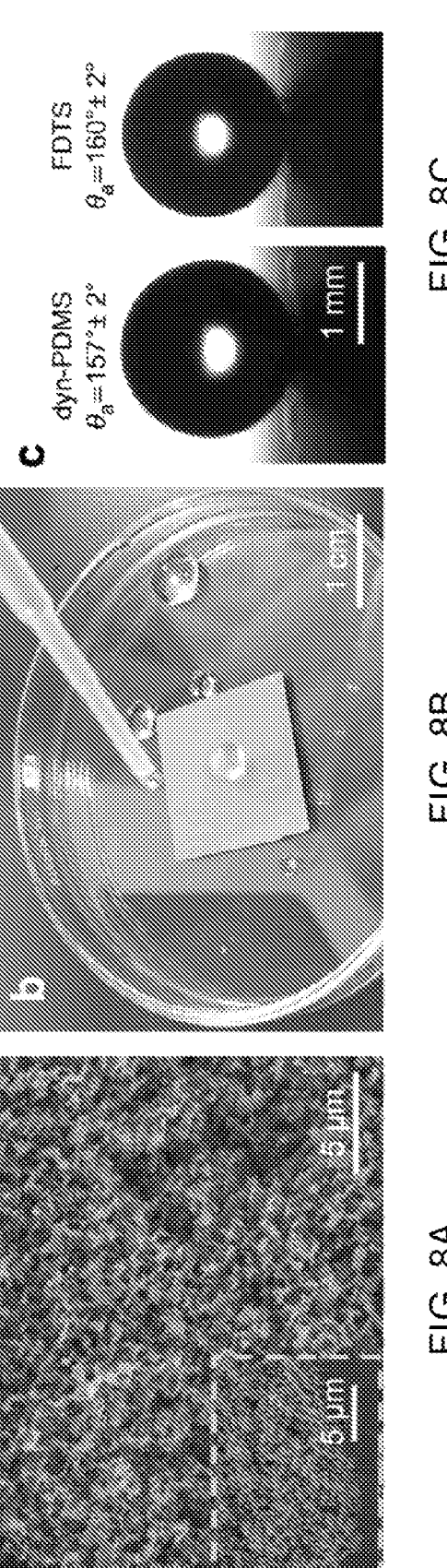
FIG. 8A is a scanning electronic microscopy (SEM) image of an exemplified etched aluminum substrate. (inset: cross-section SEM image).
FIG. 8B is a photograph of dropping water droplets on 2 cm×2 cm sized exemplified dyn-PDMS coated etched aluminum plate.
FIG. 8C is a comparison between the wettability of exemplified dyn-PDMS and FDTS modified etched aluminum.
Figures 9A, 9B, 9C, 9D, 9E, 10A, 10B, 10C, 10D, 10E:
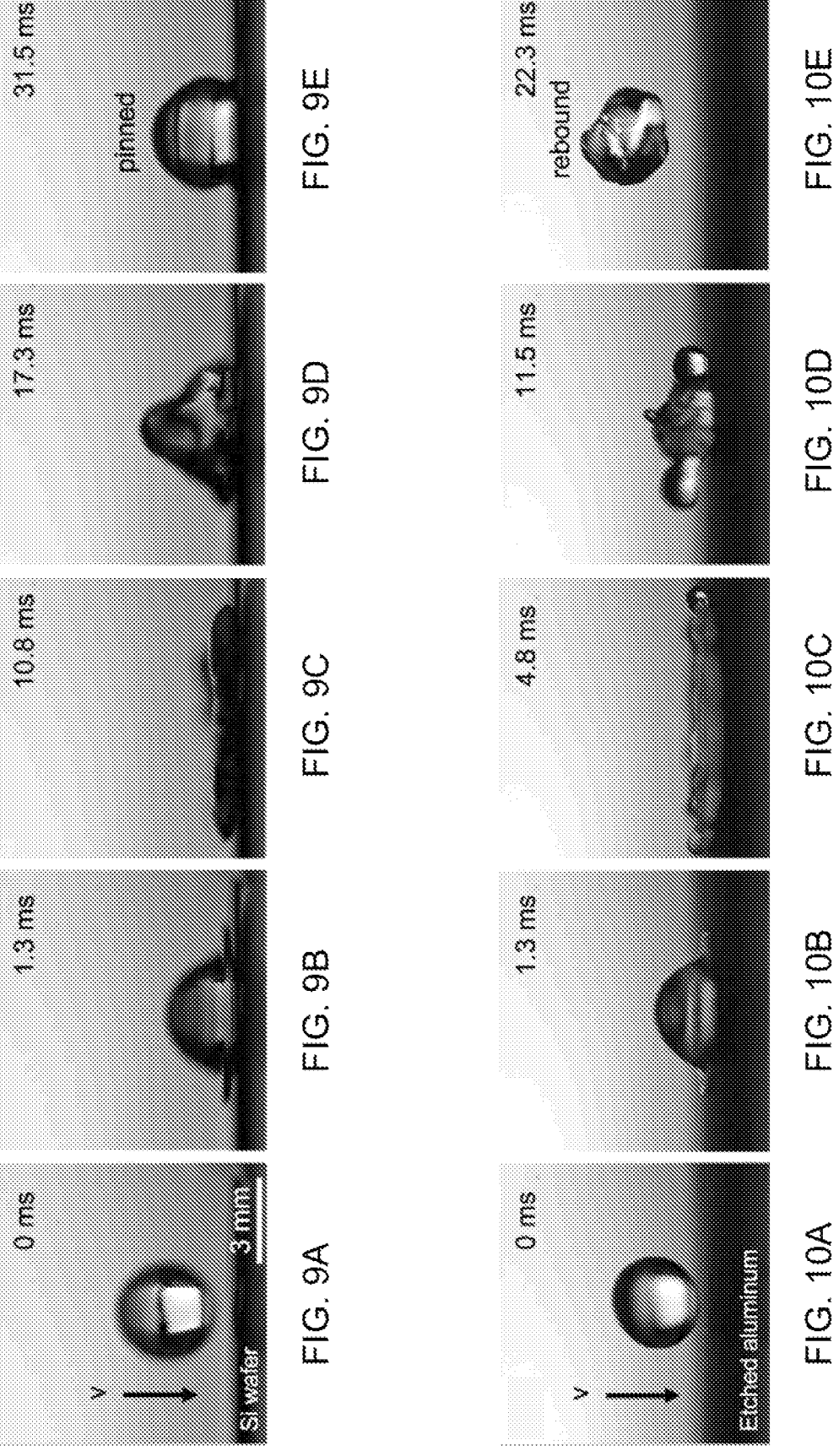
FIGS. 9A-9E are time-lapse images of water droplet impacting on exemplified dyn-PDMS coated silicon wafer, where gravity points downward in all images.
FIGS. 10A-10E are time-lapse images of water droplet impacting on dyn-PDMS coated etched aluminum, where gravity points downwards in all images.

Dyn-PDMS can also be utilized to fabricate superhydrophobic surfaces ($\theta_a>150°$) on textured substrates by a variety of techniques like spin-coating and dip-coating. To demonstrate this, a superhydrophobic surface was designed by spin-coating the dyn-PDMS solution with a receding contact angle above 90° (1.7:1 dyn-PDMS) onto a hydrochloric acid etched aluminum substrate, which has micronscale roughness (FIGS. 8A and 8B). The etched aluminum substrate was chosen for its wide applicability and straightforward and scalable fabrication. The advancing contact angle of the sample was measured by microgoniometer, which gives $\theta_a=157°\pm2°$ with hysteresis <5°. The wettability of dyn-PDMS and fluorinated-silane modified etched aluminum were compared and found their advancing contact angle was almost identical, as shown in FIG. 8C. This indicates that, although PFC materials have higher hydrophobicity on flat surfaces, using a textured substrate brings PFC and dyn-PDMS materials to comparable contact angles. Water droplets show high mobility on the superhydrophobic dyn-PDMS surface compared to the flat hydrophobic dyn-PDMS surface through a droplet impacting experiment. Upon a DI water droplet (radii=1.7 mm) impact on both surfaces at a speed of 1.3 m/s, the droplet was pinned on the flat hydrophobic dyn-PDMS surface and unable to bounce back, as shown in FIGS. 9A-9E. The droplet impacted on the superhydrophobic dyn-PDMS surface completely bounced back and left the surface free of any water, as shown in FIGS. 10A-10E.

Methods

Deposition of $CF_x$ thin films: Conformal fluorine polymer CFx (x~1) was deposited on an Si substrate by PECVD using $Ar/C_4F_8$ as a feeding gas. Prior to PECVD, the Si substrates was prepared by rinsing sequentially with acetone, IPA, water, and IPA, followed by drying with a clean nitrogen gas stream. Finally, the samples were cleaned by $O_2/Ar$ plasma inside a chamber (Plasmatherm SLR 770, ICP) to remove any adsorbed hydrocarbons on the surface. The CFx deposition was then performed inside the same chamber at a pressure of ~20 mTorr and at ~50° C. for 15 seconds.

Thin film thickness measurement: The thickness of the thin films was measured by spectroscopic ellipsometry on a J.A. Woollam VASE instrument. Spectra were collected from 300 to 1000 nm wavelengths. Film thickness was determined using the following optical model: layer 1=Si (substrate), layer 2=$SiO_2$ (thickness=2 nm), layer 3=Cauchy model (A, B, C and thickness=free parameters). The thickness of layer 3 corresponds to the thickness of the polymer film. A Cauchy model was used to determine the refractive index n of the CFx layer with respect to wavelength, (in μm): $n(J)=A+B/J^2+C/J^4$. Optical parameters, A=1.37, B=0.03, C=0 were initially taken. For dyn-PDMS film, optical parameters, A=1.5, B=0, C=0 were initially taken. The thickness of the 10-nm dyn-PDMS film was also determined by AFM step scanning. Next, a step was made in the film by first adhering Kapton tape to the polished silicon wafer, then treating the surface by chemical cleaning and plasma cleaning. Then, spun-coated the network solvent on the sample. The tape was peeled off after the thermal annealing of the film, and an AFM scanning was performed at the peel section, which yields a coating thickness of h~4±3 nm. The relatively high uncertainty originates from the experimental difficulty to make a clean step, considering that the coating is able to flow to some extent. However, the thickness and IR spectrum mapping ensured the presence of the film.

Fabrication of etched aluminum substrate: The as-purchased aluminum surfaces (Aluminum 6061, McMaster-Carr) were first cleaned with acetone, ethanol, IPA and de-ionized water. For creating microscale roughness, the surface was immersed in 2M Hydrochloric acid for 15 minutes and rinsed with de-ionized water afterwards. The 2M Hydrochloric acid was prepared by diluting as purchased 37% w/w Hydrochloric acid (HCl, Sigma-Aldrich, CAS #7647-01-0) with de-ionized water.

Fabrication of superhydrophobic vitrimer film sample: A solution of 1.7:1 PDMS to boric acid was prepared by dissolving the boric acid in 3 mL of IPA and mixing with the 1 mL PDMS in a 20 mL vial at 60° C. The solution was then stirred at 110° C. on a hot plate and most IPA evaporated. When the solution in the vial decreased to 2 mL, the solution was in a 1:1 ratio of PDMS to IPA. The etched aluminum substrate was washed sequentially with ethanol/water/IPA and blown dry. 150 μL of 1.7:1 dyn-PDMS solution was pipetted onto the 2 $cm^2$ substrate and spun coat following the same procedure as all above samples. The substrate was the cured in a vacuum oven at 110° C. for 17 hours.

Fabrication of fluorinated-silane modified etched aluminum sample: 1H,1H,2H,2H-Perfluorodecyltrimethoxysilane (FDTS, CAS #83048-65-1, Dow Corning Co.) was deposited on etched aluminum surfaces using vapor-phase deposition. Samples were first rinsed with acetone, IPA, and de-ionized water, dried in a clean nitrogen ($N_2$) flow, and cleaned with plasma cleaner. Then, samples and a 50 mL beaker containing 1 mL of FDTS toluene solution (5% v/v) were sealed in a glass container and heated in an atmospheric pressure oven (Lindberg Blue M) at 80° C. for 3 h. This process allowed for the development of a highly conformal (monolayer thick) silane layer on surfaces.

Atomic force microscopy (AFM) scanning and scratching: The developed surfaces were scanned by AFM (Cypher, Asylum Research) in air tapping mode using a cantilever with a tip radius <10 nm (Tap 300AL-G, TED PELLA, INC). For sample scratching, we used the same tip in contact mode, and the force applied to the tip (F) was controlled by the applied voltage (U) with a calibrated correlation of F (nN)=600 U(V). To create line scratches, the tip was moved at a speed of 1 μm/second. Area scratches were made by scanning the area (200 nm×200 nm) of interest with a resolution of 256×256 at contact mode at a frequency of 1 Hz.

ATR-FTIR characterization: Substrates comprising of Si wafers having 3 mm×3 mm sizes were coated with various thin films and placed on top of a diamond crystal in the Single Reflection ATR setup of the ALPHA Bruker FT-IR Spectrometer with Platinum ATR module. All samples were around 600 μm thick and held in place by the clamp mechanism. The pure diamond crystal is brazed into tungsten carbide hard metal which allows for high clamping pressures. The spectral range for the FTIR Spectrometer used was 8,000 cm$^{-1}$ to 10 cm$^{-1}$.

AFM-IR characterization: In AFM-IR (Molecular Vista), light-matter interaction of the structure can be captured by an AFM cantilever coupled with a light source. A tunable infrared laser (quantum cascade laser, QCL) is incident at the tip-sample interaction, thus inducing a plasmonic effect at the metal coated tip apex (ppp-NCHAu from Nanosensors™, spring constant=42 N/m) and creating a lightning rod effect. Therefore, a highly concentrated electromagnetic wave can be induced on the target structure. The photoinduced force is the dipole-dipole interaction between a polarized particle (or atom) on the surface with the image on the tip apex. The near-field optical absorption is captured by using suitable lock-in amplifiers. The cantilever is modulated at the second harmonic (~1.5 MHz) and the laser is modulated at a frequency, f, where f is the difference between the first and second harmonic of the cantilever. The optical response is collected at the first harmonic (~250 kHz) of the cantilever.

Nano-indentation: Pinholes in 6×6 arrays on dyn-PDMS and CF$_x$ thin films were fabricated by nanoindentation (Hysitron TI 950 TriboIndenter). The distance between each pinhole was roughly 30 μm and the depth of each indent was controlled by applying a force of 1.2 mN from the indenting tip (Berkovich TI-0039 standard tip, Bruker) to the samples. The average indent depth on the CF$_x$ surface was 70±10 nm and on the dyn-PDMS surface was 25±5 nm. Both indents were deeper than coating thickness to ensure the coating was fully penetrated.

Long-term condensation testing: The samples were attached to a Peltier stage (TP104SC, Instec) oriented vertically using double side copper tape. The stage was connected to a temperature controller (mK2000, Instec) that was set to 5.0±0.1° C. All condensation experiments were done in ambient conditions (22° C., 45% relative humidity). A Canon EOS Rebel T6 camera with macro lens (Canon MP-E 65 mm F/2.8 1-5×) captured images of the condensing water droplets at a 2592×1728 pixel resolution. The sample was illuminated with an LED ring light (LED-144-YK, AmScope).

Condensation observation with the optical microscope: A top-view optical microscope (Nikon Eclipse LV100) coupled to a monochrome camera (Nikon DS-Qi2) was used to study water droplet condensation and evaporation in a laboratory environment having air temperature Ta=22±1° C. and a relative humidity RH=45±5% (RO120, Roscid Technologies). We placed the samples horizontally on a cold stage (Linkam T95-PE) and reduced the stage temperature to Tc=5.0±0.1° C. to initiate and observe droplet growth.

Droplet impact experiment: The deionized water for the impacting experiment was supplied to a 25 gauge needle from a gravity bag (Enteral Feeding Gravity Bag, Dynarex) attached to the ceiling of the room. Droplets having radii ~1.7 mm formed at the tip of the needle and impacted the substrate from a height h~10 cm, resulting in an impact speed of v=1.3 m/s (absolute velocity). A high-speed camera (Phantom v711, Vision Research), coupled to a 1-5× macro lens (Canon MP-E 65 mm F/2.8 1-5×), recorded the impacting droplets at frame rates of 4000 frames per second (fps) and resolutions of 1024×768. A fiber-optic cable connected to a light source (EKE 150W, Kramer Scientific) provided sufficient back-lighting to achieve an exposure time of 10-30 μs.

Surface energy measurements: The surface energies of a flat surface(s) can be measured by the contact angle approach based on the Fowkes model. The model assumes that the surface energy has two components, one is dispersive surface energy $\gamma_{s,d}$ and another is polar component $\gamma_{s,p}$. The two components of surface energy can be determined by measuring the intrinsic advancing contact angle of water ($\theta_{H_2O}$) and diiodomethane ($\theta_{CH_2I_2}$). All apparent contact angles were measured on at least 3 spatially distinct spots on the surface using a piezoelectric micro-goniometer (MCA-3, Kyowa), with measurement result summarized in Table S1, along with the uncertainty as defined by the standard deviation of the measurement results. The maximum base radius of the sessile droplets was controlled such that it is smaller than the capillary length (~3 mm) of both water and diiodomethane to ensure the contact angle is not affected by gravity.

The dispersive surface energy, $\gamma_{s,d}$, is measured using diiodomethane (Sigma Aldrich, ReagentPlus, 99%. $\gamma_{CH_2I_2,d}$=50.8 mJ/m$^2$, $\gamma_{CH_2I_2,p}$=0 mJ/m$^2$ at 20° C.) as probing liquid:

$$\gamma_{s,d} = \frac{\gamma_{CH_2I_2}^2\left(1 + \cos\theta_{CH_2I_2}\right)^2}{4\gamma_{CH_2I_2,d}} \tag{S1}$$

Then, di-ionized (DI) water ($\gamma_{H_2O}$, =21.8 mJ/m$^2$, $\gamma_{H_2O,p}$=51.0 mJ/m$^2$ at 20° C.) was used to obtain $\gamma_{s,p}$:

$$\gamma_{s,p} = \frac{\left[\gamma_{H_2O}\left(1 + \cos\theta_{H_2O}\right) - 2\sqrt{\gamma_{s,d}\gamma_{H_2O,d}}\right]^2}{4\gamma_{H_2O,p}} \tag{S2}$$

Contact angle measurements were performed on at least three different spots on each surface, and the uncertainties of contact angle $\Delta\theta_{CH_2I_2}$ and $\Delta\theta_{H_2O}$ are defined as the standard deviation of the different measurements. The uncertainty of $\gamma_{s,d}$ is calculated by:

$$\Delta\gamma_{s,d} = \left|\frac{\partial\gamma_{s,d}}{\partial\theta_{CH_2I_2}}\Delta\theta_{CH_2I_2}\right|, \tag{S3}$$

and the uncertainty of $\gamma_{s,p}$ is calculated by:

$$\Delta\gamma_{s,p} = \sqrt{\left(\frac{\partial\gamma_{s,p}}{\partial\theta_{H_2O}}\Delta\theta_{H_2O}\right)^2 + \left(\frac{\partial\gamma_{s,p}}{\partial\gamma_{s,d}}\Delta\gamma_{s,d}\right)^2} \tag{S4}$$

The optical microscopy image of droplet contact angles are included in figure S6. Using the method mentioned above, the surface energy of the 1.5:1 dyn-PDMS is determined to be $\gamma_{s,d}$=21.8±0.6 mJ/m$^2$, $\gamma_{s,p}$=3.1±0.9 mJ/m$^2$. The surface energy of the 1.7:1 dyn-PDMS is determined to be $\gamma_{s,d}$=21.3±0.6 mJ/m$^2$, $\gamma_{s,p}$=1.2±0.7 mJ/m$^2$.

Chemical robustness of dyn-PDMS thin film: The chemical robustness of a 10 nm thick dyn-PDMS films (both 1.5:1 and 1.7:1) were empirically tested by measuring the change in apparent advancing contact angle and contact angle hysteresis of deionized-water droplets deposited on samples that have been immerses into different liquid environments (100 mL) for 24 hours. The size of the samples was 1 cm×1 cm. The liquid used for testing include: organic solvents such as isopropyl alcohol (IPA, CAS #67-63-0, Fisher Chemical), salt water (0.6 mol/L NaCl solution, CAS #7647-14-5, Millipore Corporation), acid solution (0.1 mol/L $H_2SO_4$ solution, pH value~0.7, CAS #7664-93-9, Macron Fine Chemicals), and distilled water (CAS #7732-18-5, Fisher Chemical) as control. During testing, the beakers containing the sample and test liquid were covered by aluminum foil (Reynolds Wrap). The samples immersed in IPA, salt water, and DI-water were taken out after 24 hours of immersion for contact angle measurement. Samples immersed in the 0.1 M $H_2SO_4$ solution were taken out after a fixed intervals of immersion time (0.5 hour, 1 hour, 2 hours, and 24 hours) for contact angle measurement. Prior to conducting the measurements, the samples were rinsed with deionized-water then blown try with a clean $N_2$ gas flow. The uncertainties of the measurements were determined by considering the standard deviation between the three measurements of different locations of one sample.

Sample thickness measurement by IR-AFM: To ensure the existence of the 10-nm 1.5:1 dyn-PDMS on the polished silicon wafer, an AFM step measurement was performed. The substrate prepared was a 3 cm×3 cm polished silicon wafer. The wafer was first cleaned by rinsing in acetone, IPA, water and IPA in sequence, then dried with a clean $N_2$ gas stream. Then, Kapton tape (Purchased from Uline) was partially stuck on to the edge of the silicon wafer. The sample was then further purified through air plasma cleaning (Harrick Plasma, PDC-32G) for ten minutes at high power (RF, 18 W). The 10 nm dyn-PDMS film was then deposited on the cleaned substrate by the spin-coating and annealing process.

Prior to the AFM measurement, the tapes were peeled off manually, and a 40 μm×40 μm area at boundary of the film and the polished silicon wafer was scanned. The AFM-IR first scanned the IR intensity at 1080 cm$^{-1}$ (Si—O—Si bond stretching peak) across the area, which confirmed the boundary position between the coating (has Si—O—Si bonds) and single crystal silicon wafer (limited Si—O bonds). A topology scan was then performed in the same region, where a height profile of the cut was obtained, which yielded a coating thickness of 4±3 nm. It should be noted that this thickness measurement method has a relatively high noise/signal ratio (80%) compared to ellipsometeric measurements (1%) due to the difficulty in obtain clean cuts, which can be affected by the flow of the materials and residuals after Kapton tape peeling.

The subject-matter of the disclosure may also relate to the following aspects:

A first aspect relates to a hydrophobic, self-healing coating, the coating comprising: a vitrimer film comprising a silicone polymer network crosslinked with dynamic covalent bonds comprising a boronic ester, wherein the vitrimer film has a thickness of less than 1000 nm, and wherein the dynamic covalent bonds provide a mechanism for self-healing of the vitrimer film.

A second aspect relates to the hydrophobic, self-healing coating of the first aspect, wherein the silicone polymer network comprises polydimethylsiloxane (PDMS).

A third aspect relates to the hydrophobic, self-healing coating of the first or the second aspect, wherein the vitrimer film is optically transparent.

A fourth aspect relates to the hydrophobic, self-healing coating of any preceding aspect, wherein the vitrimer film is fluorine-free.

A fifth aspect relates to the hydrophobic, self-healing coating of any preceding aspect, wherein the vitrimer film has a thickness in a range from about 1 nm to about 500 nm, from about 1 nm to about 300 nm, from about 1 nm to about 100 nm, from about 1 nm to about 50 nm, from about 1 nm to about 20 nm, and/or from about 1 nm to about 10 nm.

A sixth aspect relates to the hydrophobic, self-healing coating of any preceding aspect, wherein the vitrimer film exhibits an advancing contact angle ($\theta_a$) of 800 or higher with respect to water and/or a contact angle hysteresis from about 0° to about 40° with respect to water.

A seventh aspect relates to the hydrophobic, self-healing coating of any preceding aspect, wherein the vitrimer film comprises a surface energy of about 30 mJ/m$^2$ or less.

An eighth aspect relates to the hydrophobic, self-healing coating of any preceding aspect, wherein the vitrimer film has self-cleaning capability.

A ninth aspect relates to the hydrophobic, self-healing coating of any preceding aspect, wherein the vitrimer film maintains durability after exposing to mechanical damage including scratching, cutting, indenting, and/or steam condensation.

A tenth aspect relates to the hydrophobic, self-healing coating of any preceding aspect, wherein the vitrimer film shows no signs of degradation for at least 17 days while undergoing steam condensation.

An eleventh aspect relates to the hydrophobic, self-healing coating of any preceding aspect, wherein the vitrimer film exhibits stable dropwise condensation for at least 17 days while undergoing steam condensation.

A twelfth aspect relates to the hydrophobic, self-healing coating of any preceding aspect, wherein the vitrimer film is resistant to icing.

A thirteenth aspect relates to the hydrophobic, self-healing coating of any preceding aspect, wherein the vitrimer film is resistant to corrosion.

A fourteenth aspect relates to the hydrophobic, self-healing coating of any preceding aspect, wherein the vitrimer film is resistant to bacteria.

A fifteenth aspect relates to the hydrophobic, self-healing coating of any preceding aspect, wherein the vitrimer film is resistant to fouling.

A sixteenth aspect relates to a coated substrate displaying self-healing capability and hydrophobicity, the coated substrate comprising: a substrate comprising a metal, an alloy, a ceramic, a glass, and/or a semiconductor; a vitrimer film on the substrate, the vitrimer film comprising a silicone polymer network crosslinked with dynamic covalent bonds comprising a boronic ester, wherein the vitrimer film has a thickness of less than 1000 nm, and wherein the dynamic covalent bonds provide a mechanism for self-healing of the vitrimer film.

A seventeenth aspect relates to the coated substrate of the sixteenth aspect, wherein the substrate is part or all of a heat exchanger.

An eighteenth aspect relates to the coated substrate of the sixteenth or the seventeenth aspect, wherein the substrate is part or all of a solar panel.

A nineteenth aspect relates to the coated substrate in any of the sixteenth through the eighteenth aspects, wherein the substrate is part or all of a wind turbine.

A twentieth aspect relates to the coated substrate in any of the sixteenth through the nineteenth aspects, wherein the substrate is part or all of a building or vehicle.

A twenty-first aspect relates to the coated substrate in any of the sixteenth through the twentieth aspects, wherein the vitrimer film is optically transparent.

A twenty-second aspect relates to the coated substrate in any of the sixteenth through the twenty-first aspects, wherein the metal or alloy comprises aluminum, copper, stainless steel, titanium, and/or nickel superalloy.

A twenty-third aspect relates to the coated substrate in any of the sixteenth through the twenty-second aspects, wherein the vitrimer film exhibits an advancing contact angle ($\theta_a$) of 80° or higher with respect to water and/or a contact angle hysteresis from about 0° to about 40° with respect to water.

A twenty-fourth aspect relates to the coated substrate in any of the sixteenth through the twenty-third aspects, wherein the vitrimer film comprises a surface energy of about 30 mJ/m² or less.

A twenty-fifth aspect relates to the coated substrate in any of the sixteenth through the twenty-fourth aspects, wherein the vitrimer film has self-cleaning capability.

A twenty-sixth aspect relates to the coated substrate in any of the sixteenth through the twenty-fifth aspects, wherein the vitrimer film maintains durability after exposing to scratching, cutting, indenting and/or steam condensation.

A twenty-seventh aspect relates to the coated substrate in any of the sixteenth through the twenty-sixth aspects, wherein the vitrimer film shows no signs of degradation for at least 17 days while undergoing condensation.

A twenty-eighth aspect relates to the coated substrate in any of the sixteenth through the twenty-seventh aspects, wherein the vitrimer film exhibits stable dropwise condensation for at least 17 days while undergoing condensation.

A twenty-ninth aspect relates to the coated substrate in any of the sixteenth through the twenty-eighth aspects, wherein the vitrimer film is resistant to icing.

A thirtieth aspect relates to the coated substrate in any of the sixteenth through the twenty-ninth aspects, wherein the vitrimer film is resistant to corrosion.

A thirty-first aspect relates to the coated substrate in any of the sixteenth through the thirtieth aspects, wherein the vitrimer film is resistant to bacteria.

A thirty-second aspect relates to the coated substrate in any of the sixteenth through the thirty-first aspects, wherein the vitrimer film is resistant to fouling.

A thirty-third aspect relates to the coated substrate in any of the sixteenth through the thirty-second aspects, being used for heat transfer, water harvesting or desalination.

A thirty-fourth aspect relates to a heat transfer component comprising the coated substrate in any of the sixteenth through the thirty-third aspects for use in water treatment, power generation, petroleum refining, food processing, aviation, naval applications, and/or heating, ventilation, air conditioning and refrigeration (HVAC-R) systems.

A thirty-fifth aspect relates to a coating solution for forming a self-healing vitrimer film, the coating solution comprising: a silicone diol, a crosslinking agent, and an organic solvent, wherein the crosslinking agent comprises a boron compound.

A thirty-sixth aspect relates to the coating solution of the thirty-fifth aspect, wherein the silicone diol comprises a polydimethylsiloxane (PDMS) diol.

A thirty-seventh aspect relates to the coating solution of the thirty-fifth or thirty-sixth aspect, wherein the silicone diol has an average molecular weight in a range from 500 g/mol to about 11,000 g/mol.

A thirty-eighth aspect relates to the coating solution in any of the thirty-fifth through the thirty-seventh aspects, having a viscosity in a range from about 25 cSt to about 10,000 cSt.

A thirty-ninth aspect relates to the coating solution in any of the thirty-fifth through the thirty-eighth aspects, wherein the boron compound is selected from the group consisting of: boric acid, boronic acid and boronic acid derivatives.

A fortieth aspect relates to the coating solution in any of the thirty-fifth through the thirty-ninth aspects, wherein the boronic acid derivative is selected from the group consisting of: phenyl diboronic acid, biphenyl diboronic acid, tetrahydroxydiboron, diboronic acid, and thiophenediylbisboronic acid.

A forty-first aspect relates to the coating solution in any of the thirty-fifth through the fortieth aspects, wherein the organic solvent is selected from the group consisting of: methanol, ethanol, isopropanol, toluene, tetrahydrofuran, ethyl acetate, and chloroform.

A forty-second aspect relates to the coating solution in any of the thirty-fifth through the forty-first aspects, wherein a stoichiometric ratio of the silicone diol to the crosslinking agent is in a range from about 1:1 to about 10:1, from about 1:1 to about 5:1, from about 1:1 to about 2:1, from about 1.2:1 to about 1.9:1, from about 1.3:1 to about 1.8:1, from about 1.5:1 to about 1.7:1, or from about 1.6:1 to about 1.4:1.

A forty-third aspect relates to the coating solution in any of the thirty-fifth through the forty-second aspects, wherein a weight ratio of the boron compound to the organic solvent is in a range from about 1:100 to about 1:5000.

A forty-fourth aspect relates to a method of forming a hydrophobic, self-healing coating on a substrate, the method comprising: depositing the coating solution in any of the thirty-fifth through the forty-third aspects onto a substrate to form a coated substrate; heating the coated substrate under vacuum, whereby the silicone diol and the crosslinking agent react to form a vitrimer film comprising a silicone polymer network crosslinked with dynamic covalent bonds comprising a boronic ester.

A forty-fifth aspect relates to the method of the forty-fourth aspect, wherein the silicone polymer network comprises polydimethylsiloxane (PDMS).

A forty-sixth aspect relates to the method of the forty-fourth or forty-fifth aspect, wherein the depositing comprises spin-coating, dip-coating, spray-coating and/or brush coating.

A forty-seventh aspect relates to the method in any of the forty-fourth through the forty-sixth aspects, wherein the heating is carried out in a vacuum oven at a pressure of no greater than about 250 mTorr.

A forty-eighth aspect relates to the method in any of the forty-fourth through the forty-seventh aspects, wherein the heating is carried out at a temperature in a range from about 80° C. to about 120° C.

A forty-ninth aspect relates to the method in any of the forty-fourth through the forty-eighth aspects, wherein the heating occurs over a time duration in a range from about 12 hours to about 18 hours.

A fiftieth aspect relates to the method in any of the forty-fourth through the forty-ninth aspects, further comprising, prior to depositing the coating solution, cleaning the substrate by alcohol and/or water to form a cleaned substrate.

A fifty-first aspect relates to the method in any of the forty-fourth through the fiftieth aspects, wherein the alcohol is selected from the group consisting of: methanol, ethanol, and propanol.

A fifty-second aspect relates to the method in any of the forty-fourth through the fifty-first aspects, further comprising, after cleaning the substrate, purifying the substrate.

A fifty-third aspect relates to the method in any of the forty-fourth through the fifty-second aspects, wherein the purifying comprises plasma cleaning.

A fifty-fourth aspect relates to the method in any of the forty-fourth through the fifty-third aspects, further comprising, prior to depositing the coating solution, heating, stirring, and/or filtering the coating solution.

A fifty-fifth aspect relates to the method in any of the forty-fourth through the fifty-fourth aspects, wherein, during heating of the coating solution, reaction of the silicone diol with the crosslinking agent is initiated, and then halted by cooling.

A fifty-sixth aspect relates to the method in any of the forty-fourth through the fifty-fifth aspects, wherein the substrate is made from a material selected from the group consisting of: a metal, an alloy, a ceramic, a glass, and a semiconductor.

A fifty-seventh aspect relates to the method in any of the forty-fourth through the fifty-sixth aspects, wherein the substrate comprises a metal or an alloy comprising aluminum, copper, stainless steel, titanium, and/or nickel superalloy.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A hydrophobic, self-healing coating comprising:
a vitrimer film comprising a silicone polymer network crosslinked with dynamic covalent bonds comprising a boronic ester,
wherein the vitrimer film has a thickness of less than 100 nm,
wherein the dynamic covalent bonds provide a mechanism for self-healing of the vitrimer film, wherein the self-healing is achieved autonomously at room temperature, and
wherein the vitrimer film shows no signs of degradation as quantified by the lack of formation of water blisters or increased contact angle hysteresis for at least 17 days while undergoing steam condensation, and/or wherein the vitrimer film exhibits stable dropwise condensation for at least 17 days while undergoing steam condensation.

2. The hydrophobic, self-healing coating of claim 1, wherein the silicone polymer network comprises polydimethylsiloxane (PDMS).

3. The hydrophobic, self-healing coating of claim 1, wherein the vitrimer film is optically transparent.

4. The hydrophobic, self-healing coating of claim 1, wherein the vitrimer film is fluorine-free.

5. The hydrophobic, self-healing coating of claim 1, wherein the vitrimer film has a thickness in a range from about 1 nm to about 10 nm.

6. The hydrophobic, self-healing coating of claim 1, wherein the vitrimer film exhibits an advancing contact angle $(\theta_a)$ of 80° or higher with respect to water and/or a contact angle hysteresis from about 0° to about 40° with respect to water.

7. The hydrophobic, self-healing coating of claim 1, wherein the vitrimer film maintains durability after exposure to mechanical damage including scratching, cutting, indenting, and/or steam condensation.

8. A coated substrate displaying self-healing capability and hydrophobicity comprising:
a substrate comprising a metal, an alloy, a ceramic, a glass, and/or a semiconductor;
a vitrimer film on the substrate, the vitrimer film comprising a silicone polymer network crosslinked with dynamic covalent bonds comprising a boronic ester,
wherein the vitrimer film has a thickness of less than 100 nm,
wherein the dynamic covalent bonds provide a mechanism for self-healing of the vitrimer film, wherein the self-healing is achieved autonomously at room temperature, and
wherein the vitrimer film shows no signs of degradation as quantified by the lack of formation of water blisters or increased contact angle hysteresis for at least 17 days while undergoing steam condensation, and/or wherein the vitrimer film exhibits stable dropwise condensation for at least 17 days while undergoing steam condensation.

9. The coated substrate of claim 8, wherein the substrate is part or all of a heat exchanger, a solar panel, a wind turbine, or a building or vehicle.

10. The coated substrate of claim 8, wherein the metal or alloy comprises aluminum, copper, stainless steel, titanium, and/or a nickel superalloy.

11. The coated substrate of claim 8, wherein the vitrimer film comprises a surface energy of about 30 mJ/m$^2$ or less.

12. The coated substrate of claim 8, wherein the vitrimer film is resistant to icing, corrosion, bacteria, and/or fouling.

13. A heat transfer component comprising the coated substrate of claim 8 for use in water treatment, power generation, petroleum refining, food processing, aviation, naval applications, and/or heating, ventilation, air conditioning and refrigeration (HVAC-R) systems.

* * * * *